[11] 3,564,263

| [72] | Inventor | Clyde C. Shaw |
| | | Los Altos Hills, Calif. |
| [21] | Appl. No. | 763,757 |
| [22] | Filed | Sept. 30, 1968 |
| [45] | Patented | Feb. 16, 1971 |
| [73] | Assignee | By mesne assignments, to Coulter Electronics, Inc. Hialeah, Fla. |

[54] OPTICAL PARTICLE SENSOR HAVING A LIGHT COLLECTOR MOUNTED ON THE PHOTOSENSOR
9 Claims, 3 Drawing Figs.

[52] U.S. Cl....................................... 250/218,
250/227, 350/96, 356/103
[51] Int. Cl........................................ G01n 21/00,
G01n 21/26; G02b 5/14
[50] Field of Search........................... 250/218,
227, 216, 22M; 356/103; 350/96

[56] References Cited
UNITED STATES PATENTS
3,248,551  4/1966  Frommer.................... 250/218
3,361,030  1/1968  Goldberg..................... 250/218X
3,431,423  3/1969  Keller........................... 250/218

OTHER REFERENCES

Hinterberger et al., " Use of a Solid Light Funnel to Increase Phototube Aperture Without Restricting Angular Acceptance," 8-68, Review of Scientific Instruments Vol. 39, No. 8, pp. 1217 and 1218

*Primary Examiner*—James W. Lawrence
*Assistant Examiner*—T. N. Grigsby
*Attorney*—Silverman & Cass ABSTRACT: A black specular surfaced tube has an open end aligned with the illuminating beam of an optical particle sensor. The manner in which the black specular surfaced tube is associated with the other elements of the particle sensor permits the tube to act essentially as a black hole for conducting the unscattered light from the illuminating beam out of the particle sensor.

PATENTED FEB 16 1971
3,564,263
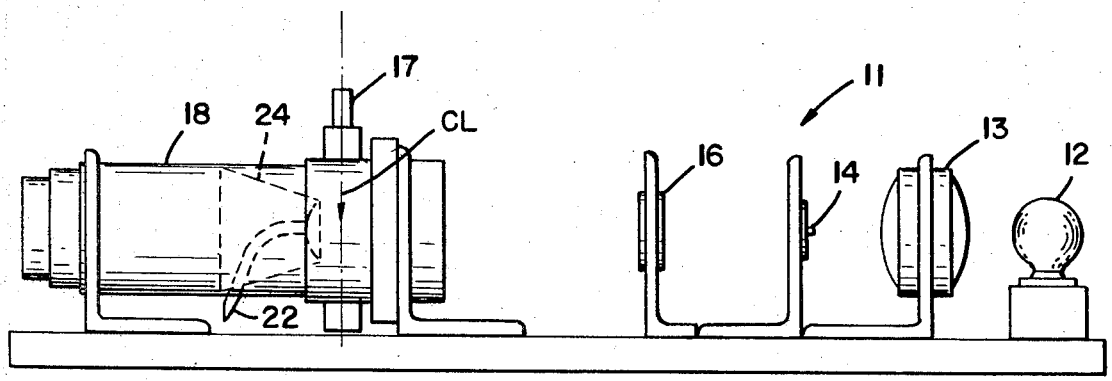
FIG_1
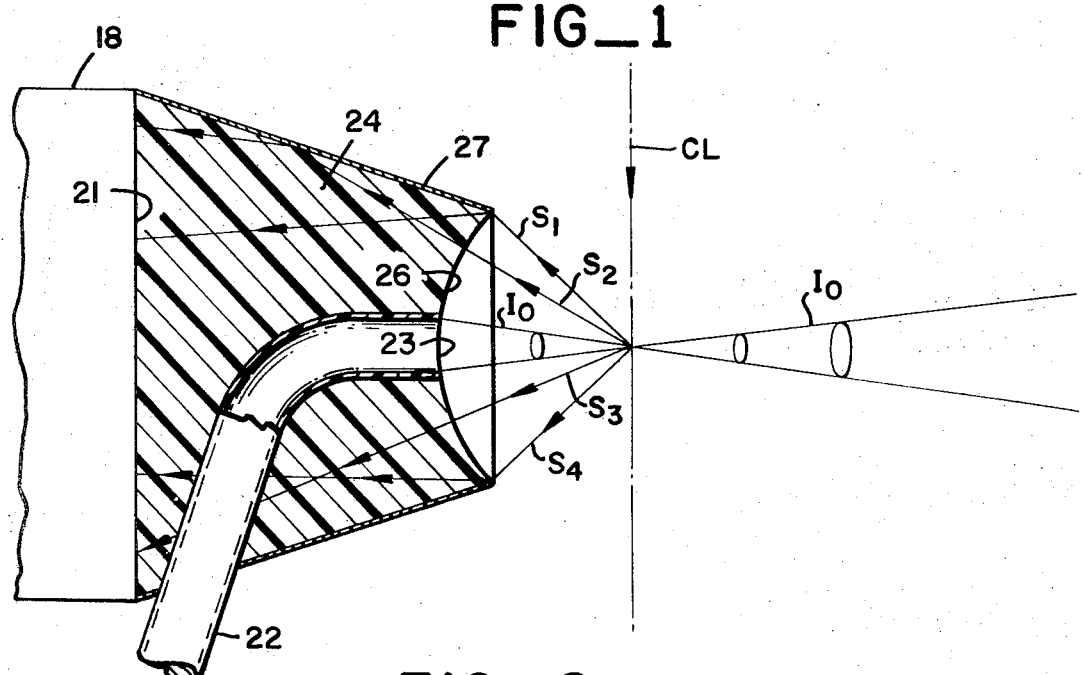
FIG_2
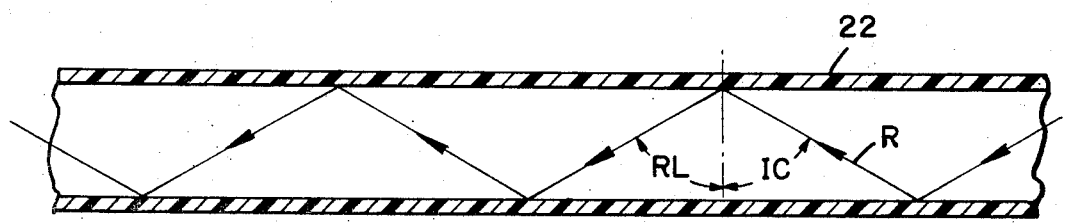
FIG_3
INVENTOR.
CLYDE C. SHAW
BY
Fryer, Tjensvold, Feix, Phillips & Lempio
ATTORNEYS

OPTICAL PARTICLE SENSOR HAVING A LIGHT COLLECTOR MOUNTED ON THE PHOTOSENSOR

The present invention relates to an optical particle sensor, either liquid or aerosol, of the kind that operates on the principle of measurement of the amount of light which is scattered when an intense illuminating beam is projected through a flow stream of suspended particles.

The particles to be measured, small solid or liquid materials, are suspended in a fluid. The illuminating beam is a focused beam. The point of focus is incident normally to the direction of flow of the suspended particles. The point of focus is also centered on the radial axis of the flow stream.

When a particle passes through the focused illuminating beam the light striking the particle is scattered. Part of the light is reflected, but by far the greater part of the light is diffracted in a forward direction. The intensity of the diffracted light can be of the order of magnitude of 40 times the intensity of the reflected light. This diffracted light, when collected and measured, will give an accurate measurement of both the particle size and the concentration of the particles in the fluid suspension.

As noted above, the illuminating beam is a relatively high intensity beam. Only a relatively small part of the intensity of the beam is scattered by striking a particle. Most of the beam passes through the suspension without ever hitting a suspended particle.

Only the scattered light is of interest for purposes of making the measurement. The unscattered light, because of its relatively high intensity, therefore must not be transmitted to the light measuring means. If the unscattered light were transmitted to the light measuring means, the intensity of the unscattered light would overpower the intensity of the scattered light to an extent such that the light measuring means would not be able to discriminate between the two kinds of light. The measuring means could not give an accurate indication of the amount or intensity of the scattered light.

It is a primary object of the present invention to dispose of the unscattered illuminating beam by conducting this part of the beam away from the light measuring means of the particle sensor.

It is a related object to do this by a black specular surfaced tube which acts essentially as a black hole. The black specular surfaced tube has an open end aligned with the axis of the illuminating beam. The open end of the tube is positioned to receive all of the light from the focused illuminating beam that passes through the stream of suspended particles without striking a particle. The black specular surface permits all of the light to be reflected specularly down the tube until it is ultimately absorbed. Since the light that is not absorbed on the first reflection within the tube is reflected specularly down the tube until it is absorbed, none of the light is reflected back out of the tube and into the sensor. The light measuring means of the sensor thus receives only the scattered light.

It is another object of the present invention to hold the black specular surfaced tube in position with a cone-shaped member that also functions to collect the scattered light.

This member is a plastic member that is bonded directly on the end surface of a photomultiplier light measuring tube. This minimizes reflection losses at these sealed surfaces and is a further specific object of the present invention.

The small end of the scattered light collecting cone-shaped member has a concave surface. The radius of curvature of the concave surface is centered on the point of focus of the illuminating beam. As a result, all the scattered light strikes the concave surface at an angle normal to the surface to minimize reflection losses at that surface. This is another specific object of the present invention.

The lateral surface of the cone is coated with a reflective coating to prevent loss of light through this lateral surface.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

In the Drawings:

FIG. 1 is a side elevation view of a particle sensor constructed in accordance with one embodiment of the present invention;

FIG. 2 is an enlarged fragmentary view, partly in cross section, showing details of the manner in which a black specular surfaced tube is incorporated in the particle sensor shown in FIG. 1; and FIG. 3 is an enlarged, fragmentary cross-sectional view through the tube of FIG. 2 showing the manner in which a light ray is reflected specularly down the length of the tube until it is ultimately absorbed.

DETAILED DESCRIPTION OF THE INVENTION

In FIG. 1 an optical, liquid or aerosol particle sensor constructed in accordance with one embodiment of the present invention is indicated generally by the reference numeral 11.

The sensor 11 includes a light source 12, a collecting lens system 13, an aperture 14 (which is dimensioned to pass just the image of the filament of the light source 12), a projection lens 16, flow tubes 17, and a photomultiplier tube 18.

The lamp 12, collecting lens 13, aperture 14 and projection lens 16 generate and focus an illuminating beam ($I_o$ as shown in FIG. 2) which is projected through a sample flow stream of particles flowing through the flow tubes 17.

The centerline of the flow stream of the suspended particles is indicated by the line CL in FIG. 2.

As illustrated in FIG. 2, the focus point of the illuminating beam $I_o$ is also located on this centerline. The illuminating beam $I_o$ will therefore intercept only a very small volume of the flow stream. This small volume is called the critical volume.

The flow tubes 17 have not been shown in FIG. 2 so that illustrative ray paths ($S_1$, $S_2$, $S_3$, and $S_4$) of the scattered light can be more clearly illustrated.

As best shown in FIG. 2, the photomultiplier tube 18 is mounted end-on (in axial alignment) with the axis of the focused illuminating beam. The photomultiplier tube 18 has a glass end surface 21. The light which is scattered when the illuminating beam strikes a suspended particle is transmitted through the glass end 21. The intensity of this light is measured by electronic circuitry in the sensor 11. The photomultiplier tube 18 thus forms a part of the light measuring means which measure the amount of scattered light. The intensity of the scattered light indicates the particle size.

The concentration of particles in most flow streams is so low that only a very small part of the illuminating beam projected through the critical volume comes in contact with a particle. The light that does not contact a particle in the critical volume is therefore of high intensity, as compared to the intensity of the scattered light, and is shown in FIG. 2 as a continuation of the focused illuminating beam $I_o$.

As noted above, the part of the illuminating beam $I_o$ that passes through the critical volume without striking a particle is light of a much greater intensity than the light that is scattered as a result of striking a particle in the critical volume. All of this unscattered light must therefore be kept out of the light measuring means or the light measuring means cannot produce an accurate measurement of the scattered light.

In accordance with the present invention, a specular surfaced tube is placed in front of the photomultiplier tube 18. The specular surfaced tube 22 has an open end 23 aligned with the axis of the illuminating beam $I_o$. The end 23 is positioned to receive all of the light from the illuminating beam $I_o$ that passes through the critical volume without striking a particle.

The tube 22 is a black tube to produce maximum absorption of the illuminating beam $I_o$. However, not all of the light is absorbed on the first contact of the light with the black surface of the tube. Some of the light is reflected. Since all of the light is not absorbed it is very important that the light that is reflected is reflected in a manner such that it is not reflected back out of the tube and into the sensor.

It is for this reason that the tube 22 has a specular surface.

As best illustrated in FIG. 3, the specularity of the surface permits the tube to act as a mirror in which the angle of incidence (IC) equals the angle of reflection (RL) of a light ray R of the illuminating beam $I_o$ as shown diagrammatically in FIG. 3. In this manner the light is reflected specularly down the tube 22 until it is ultimately absorbed by the black color of the tube. While the diagrammatic view of FIG. 3 shows a perfectly straight tube, the curved tube 22 actually used in the sensor will function in the manner described with reference to FIG. 3 as long as the curvature of the tube is not too great.

As illustrated in FIG. 1, the outer end of the tube 22 is preferably closed.

The tube 22 is held in the position illustrated by a cone-shaped member 24. This cone-shaped member 24 also functions to collect the light that is scattered by particles in the flow stream.

The axis of the member 24 is coincident with the axis of the illuminating beam $I_o$.

The base of the member 24 is mounted directly on the end surface 21 of the photomultiplier tube. The member 24 is preferably a plastic member cast on the surface 21 to form a sealed surface with the glass face 21 of the photomultiplier tube. The plastic material wets the surface of the photomultiplier tube very well so that the manner in which these two surfaces are joined minimizes reflection losses.

The other end of the member 24, the small end adjacent the flow stream, has a concave surface 26. This concave surface is a spherical surface and has a center of curvature located at the focal point of the illuminating beam $I_o$ and the critical volume. As a result each ray scattered by striking a particle in the flow stream is incident to the surface 26 in a normal direction. This minimizes reflection losses at the surface 26.

The surface 26 can be made and can be located to collect any desired scatter angle of the rays ($S_1$, $S_2$, $S_3$, and $S_4$ as illustrated in FIG. 2) scattered by striking a particle in the flow stream. However, from a practical standpoint, collecting rays that scatter at angles of from 30° to 70° is quite adequate to produce accurate measurements. Limiting the collection angle to this range also simplifies production.

The side surface of the member 24 is coated with a reflective coating, such as aluminum, as indicated by the reference numeral 27. This coating prevents the loss of light through the sides of the member 24. Thus, rays $S_1$, $S_2$, and $S_4$, that are scattered at angles such that these rays might be lost out of the side surface of the member 24, are reflected by the reflective coating 27 and are thus transmitted to the photomultiplier tube 18 for measurement.

The scattered light collecting member 24 is therefore a highly efficient collecting member. About 90 percent of the light within the scatter angle the member 24 is designed to collect is actually collected and transmitted to the photomultiplier tube 18.

The light collection system illustrated in FIG. 2 presents several advantages. There are no optics, except to the extent the curved surface 26 may be considered an optical surface, or lens elements after the critical volume. After the critical volume there is no imaging capability in the collection system. This eliminates the need for alignment. This also reduces the space required, in comparison to the space that would be required for a system in which it would be necessary to image after the critical volume.

Even through there are no optics after the critical volume, the present system is a highly efficient system.

There is a cost advantage. Since there are no elements or adjustments, costs associated with such elements or adjustments are avoided.

From the efficiency standpoint, eliminating optics and lens elements after critical volume also eliminates the chances for losses necessarily associated with such optics and lens elements.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. For use in an optical particle sensor for determining the particle size and number concentration of particles suspended in a flow stream by measuring the scattering of a focused light beam projected through the flow stream, said sensor comprising, measuring means for measuring scattered light received at the measuring means, flow means for directing a stream of suspended particles in front of the measuring means, and illuminating means for focusing an illuminating beam of light on a critical volume of the stream; the improvement which comprises, a specular surfaced tube located between the stream and the measuring means and having an open end aligned with the illuminating beam and positioned to receive and contain all of the light from the focused illuminating beam that passes through the stream of suspended particles without being scattered or absorbed by the particles, and a scattered light collecting member mounted on the receiving surface of the measuring means with the axis of the collecting member coincident with the axis of the focused illuminating beam and wherein said member holds said open end of the specular surfaced tube in the aligned position with respect to the illuminating beam.

2. A particle sensor as defined in claim 1 wherein the measuring means include a photomultiplier tube having a tube surface positioned to receive the scattered light and wherein the specular surfaced tube is a black tube which conducts the unscattered illuminating beam away from said surface of the photomultiplier tube while absorbing the beam as the beam is conducted specularly down the interior of the tube.

3. A particle sensor as defined in claim 1 wherein said collecting member is a plastic member which is bonded to said surface of the measuring means to form a sealed interface which minimizes reflection losses and wherein the end of the plastic member adjacent the critical volume is a concave surface having a radius of curvature located at the center of said critical volume so that all scattered light strikes the concave surface in a direction normal to the surface to minimize reflection losses at the surface.

4. A particle sensor as defined in claim 3 wherein the collecting member is cone-shaped and has a lateral surface covered with a reflective coating to prevent light losses through the lateral surface.

5. An optical particle sensor for determining the particle size and concentration of particles suspended in a flow stream by measuring the scattering of a focused light beam projected through the flow stream, said particle sensor comprising, measuring means for measuring scattered light including a photomultiplier tube having a tube surface positioned to receive the scattered light, flow means for directing a stream of suspended particles in front of the tube surface, illuminating means for focusing an illuminating beam of light on a critical volume of the stream, and a light collecting conical member mounted on the tube surface with the axis of the conical member coincident with the axis of the focused illuminating beam.

6. A particle sensor as defined in claim 5 wherein the light collecting conical member is a plastic member bonded to said tube surface to form a sealed interface which minimizes reflection losses.

7. A particle sensor as defined in claim 6 wherein the end of the conical member adjacent the critical volume is a concave surface having a radius of curvature located at the center of the critical volume so that all scattered light strikes the concave surface in a directional normal to the surface to minimize reflection losses at the surface.

8. A particle sensor as defined in claim 5, wherein the lateral surface of the conical member is covered with a reflective coating to prevent light losses through the lateral surface.

9. A particle sensor defined as in claim 1 wherein said light collecting member is frustum-shaped and has its major base mounted to said receiving surface of the measuring means.